(12) United States Patent
Sepe, Jr.

(10) Patent No.: US 6,792,321 B2
(45) Date of Patent: Sep. 14, 2004

(54) REMOTE WEB-BASED CONTROL

(75) Inventor: Raymond Sepe, Jr., Medfield, MA (US)

(73) Assignee: Electro Standards Laboratories, Cranston, RI (US)

( * ) Notice: Subject to any disclaimer, the term of this patent is extended or adjusted under 35 U.S.C. 154(b) by 349 days.

(21) Appl. No.: 09/796,678

(22) Filed: Mar. 2, 2001

(65) Prior Publication Data

US 2001/0047213 A1 Nov. 29, 2001

Related U.S. Application Data

(60) Provisional application No. 60/186,468, filed on Mar. 2, 2000.

(51) Int. Cl.[7] .............................................. G05B 19/18
(52) U.S. Cl. ............................... 700/65; 700/9; 700/19; 700/66; 702/188; 702/189; 709/201; 709/217
(58) Field of Search .............................. 700/9, 3, 2, 50, 700/65, 66, 19, 20; 702/188, 189; 709/217, 201

(56) References Cited

U.S. PATENT DOCUMENTS

| | | | |
|---|---|---|---|
| 5,485,491 A | | 1/1996 | Salnick et al. |
| 5,611,059 A | | 3/1997 | Benton et al. |
| 5,760,350 A | * | 6/1998 | Pepin et al. ................. 187/316 |
| 5,805,442 A | * | 9/1998 | Crater et al. .................... 700/9 |
| 5,845,230 A | * | 12/1998 | Lamberson ................. 702/188 |
| 5,917,428 A | | 6/1999 | Discenzo et al. |
| 6,298,308 B1 | * | 10/2001 | Reid et al. .................. 702/188 |
| 6,553,238 B1 | * | 4/2003 | Ginzel et al. ............... 455/557 |

* cited by examiner

*Primary Examiner*—Ramesh Patel
(74) *Attorney, Agent, or Firm*—Lacasse & Associates, LLC; Randy W. Lacasse; Ramraj Soundararajan

(57) ABSTRACT

Real-time remote monitoring and controlling of a device is described via a network such as the Internet. A virtual presence is accomplished between geographically distributed remote users and hardware platforms that allow for real-time interactive hardware operation. Using Internet based communications such as e-mail or browser based sessions, a series of remote instructions are sent from a remote computer based device to the device to be monitored and controlled. This operation of includes, but is not limited to, data monitoring, system control, system tuning, distributed learning, distributed monitoring, remote servicing and hardware reconfiguration. Furthermore, monitored data is exchanged between the device being monitored and the remote electronic-based device can be in a spreadsheet format.

34 Claims, 21 Drawing Sheets

REMOTE WEB-BASED CONTROL

RELATED APPLICATIONS

The present application claims the benefit of provisional patent application "Remote Web-Based Control", U.S. Ser. No. 60/186,468, filed Mar. 2, 2000.

BACKGROUND OF THE INVENTION

1. Field of Invention

The present invention relates generally to the field of remote communications. More specifically, the present invention is related to a network-based control system for monitoring and controlling a remote device over a network.

2. Discussion of Prior Art

Networks, such as a local area network (LAN) or wide area network (WAN), provide users with access to various information, files, and data. Furthermore, with the aid of an imaging device such as a digital camera, users are able to remotely monitor various other devices over such networks.

FIG. 1 illustrates prior art system 100 for monitoring remote device 108. In this scenario, users access network 104 (via computer 102 or 103) to monitor device 108, via video camera 106, over network (LAN or WAN) 104. It should be noted that although prior art systems, such as the one shown in FIG. 1, describe the monitoring of devices remotely over a network, none control the functionality of such devices over a LAN or WAN network.

With the advent of the World Wide Web (WWW) and the Internet, users are able to access information, data and other files with relative ease. Prior art systems (similar to the one shown in FIG. 1) can be implemented over the Internet. Therefore some prior art systems, which are extensions of the prior art system shown in FIG. 1, monitor devices remotely over the WWW or Internet.

One pitfall associated with prior art systems described above is the inability to respond in time in instances of functional failure associated with the monitored device. Reverting to the example described in FIG. 1, and further assuming that the device to be monitored 108 is a sliding door, it is seen that if the monitored device (door) is jammed and rendered inoperable, the user on the monitoring end has to call the appropriate person near the device's location to attend to (and rectify) this malfunction. Thus, there is a delay in the rectification process for clearing a malfunction associated with the monitored device. The prior art fails to rectify this delay via a network-based remote control system.

The following references describe prior art in the field of remote diagnostics. The prior art described below is similar to the system described by FIG. 1.

The U.S. Pat. No. 5,485,491 describes an online system for diagnosing operating conditions of a motor, in order to determine when motor maintenance is required. The remote diagnostic system consists of a processor (e.g., a personal computer, a mini-computer, a mainframe computer, or any type of processing device), which monitors the motor via a cable connected to a data highway (e.g., a data acquisition network, a process control network, a wide area network, etc.). It should however be noted that this patent does not address any Internet or network delays. Furthermore, this patent provides for just a monitoring device and provides no support for stimulating hardware of the monitored device.

The U.S. Pat. No. 5,611,059 describes an automated graphical control/monitoring system, which has the capability of monitoring physical devices over a network. The processing environment includes different types of monitoring/control interfaces and devices that are networked together by network coupling devices. The monitoring/control user interface (MCUI) allows a user to control the physical devices and physical parameters through a processing environment via the network connection. However, this patent provides for a real time software database, but lacks any real time control of hardware.

The U.S. Pat. No. 5,917,428 provides for a diagnostic method and apparatus for use with an electric motor, which includes an electric motor that is diagnosed via a remote computer (with display and storage analysis capabilities) using a link. The link in one of the embodiments is a RS232C standard communication link.

In all the above-described systems there is no mention of remotely monitoring and controlling various devices over a network in real-time. Furthermore, none of the prior art systems utilize unique email addresses (or unique network addresses) associated with monitored devices, for transmitting and receiving information regarding parameters to be monitored. Additionally, none of the prior art provide for concurrent local and remote operation for real time collaborative work. Whatever the precise merits, features and advantages of the above cited references, none of them achieve or fulfills the purposes of the present invention.

SUMMARY OF THE INVENTION

The present invention provides for a real-time remote collaboration via a network such as the Internet. The present invention establishes a virtual presence between geographically distributed remote users and hardware platforms that allow for real-time interactive hardware operation. This operation includes, but is not limited to, data monitoring, system control, system tuning, distributed learning, distributed monitoring, remote technical support, remote calibration, remote servicing and hardware reconfiguration.

In one embodiment, the present invention provides for a real-time network-based controlling and monitoring of an electric motor experimentation platform with an electric motor system that is used as a starter/alternator for a hybrid electric vehicle. In this embodiment, the present invention implements manual and automatic remote tuning of electric motor systems via a network such as the WWW. Furthermore, in this particular embodiment, the torque gain ($ki_d i_q$) can be adjusted manually via a graphical user interface numeric input or automatically by a remote controlled fuzzy logic based intelligent efficiency optimizer. It should however be noted that torque gain is just one example of possible adjustments. Other characteristics to be controlled are envisioned.

Moreover, the remote real-time control panel of this invention is presented as an easy-to-use graphical user interface (GUI) with access to all functionality and requiring only standard Web browsers for operation.

In addition to remote operation with real-time data monitoring, the system of the present invention generates a detailed data file that is transmitted over a network to the remote user for further analysis. In an extended embodiment, the system automatically formats the data for Excel® spreadsheets and automatically launches Excel, and loads the spreadsheet file.

In another embodiment, the remote network-based control system of the present invention is used in network-based collaborative experimentation wherein hardware experiments are interactively performed from geographically distributed locations. This allows consulting, algorithm development, and hardware demonstrations between distant parties without the need to move equipment and personnel between locations.

In yet another embodiment, the remote network-based control system of the present invention is used in network-based distance learning. In such an educational or training environment, an instructor teaching a remote class is able to integrate hardware experiments into the curriculum using the network to project a virtual presence into a distant hardware laboratory. The remote network capabilities of the present invention include electric motor and controller tuning, diagnostics, and performance monitoring.

In another embodiment, the remote network-based control system of the present invention is used in network-based equipment servicing wherein a remote service technician interactively operates, tunes, and monitors equipment at a customer's site without leaving the office.

In yet another embodiment, the remote network-based control system of the present invention is used in network-based diagnostics wherein a remote technician monitors the health of hardware systems remotely over the network.

In another embodiment, the remote network-based control system of the present invention is used in network-based mobile servicing that allows for automatic servicing, diagnostics, and tuning of vehicular systems. It should be noted that this system applies to automotive as well as other vehicular systems, civilian or military.

DESCRIPTION OF THE PREFERRED EMBODIMENTS

Figure 1:
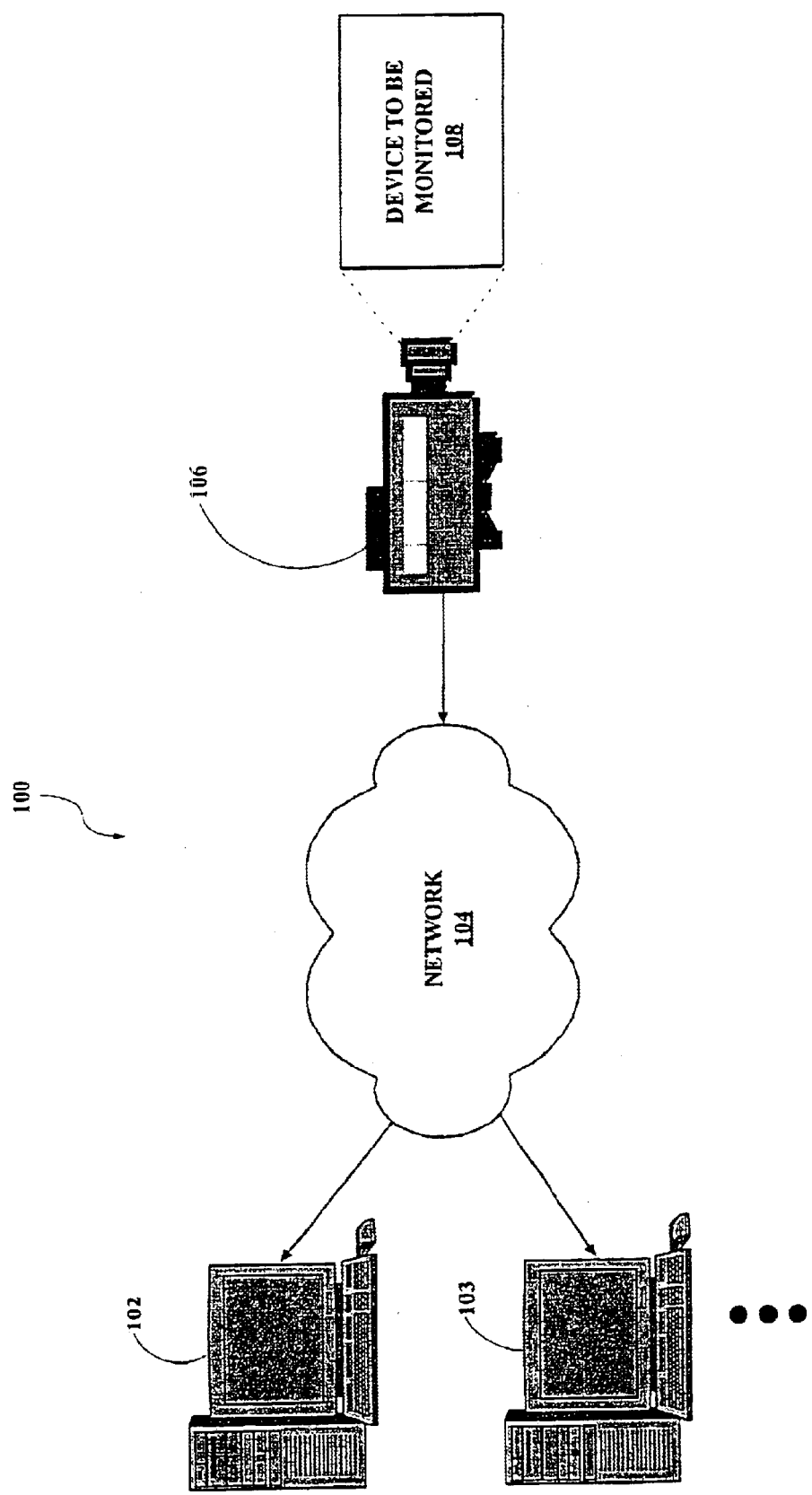
FIG. 1 illustrates a prior art system for monitoring a remote device.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The present invention provides for a method and system for real-time remote monitoring and controlling of a device via a network such as the Internet. The present invention creates a virtual presence between geographically distributed remote users and hardware platforms that allow for real-time interactive hardware operation. This operation of the present invention includes, but is not limited to, data monitoring, system control, system tuning, distributed learning, distributed monitoring, remote servicing and hardware reconfiguration.

Figure 2:
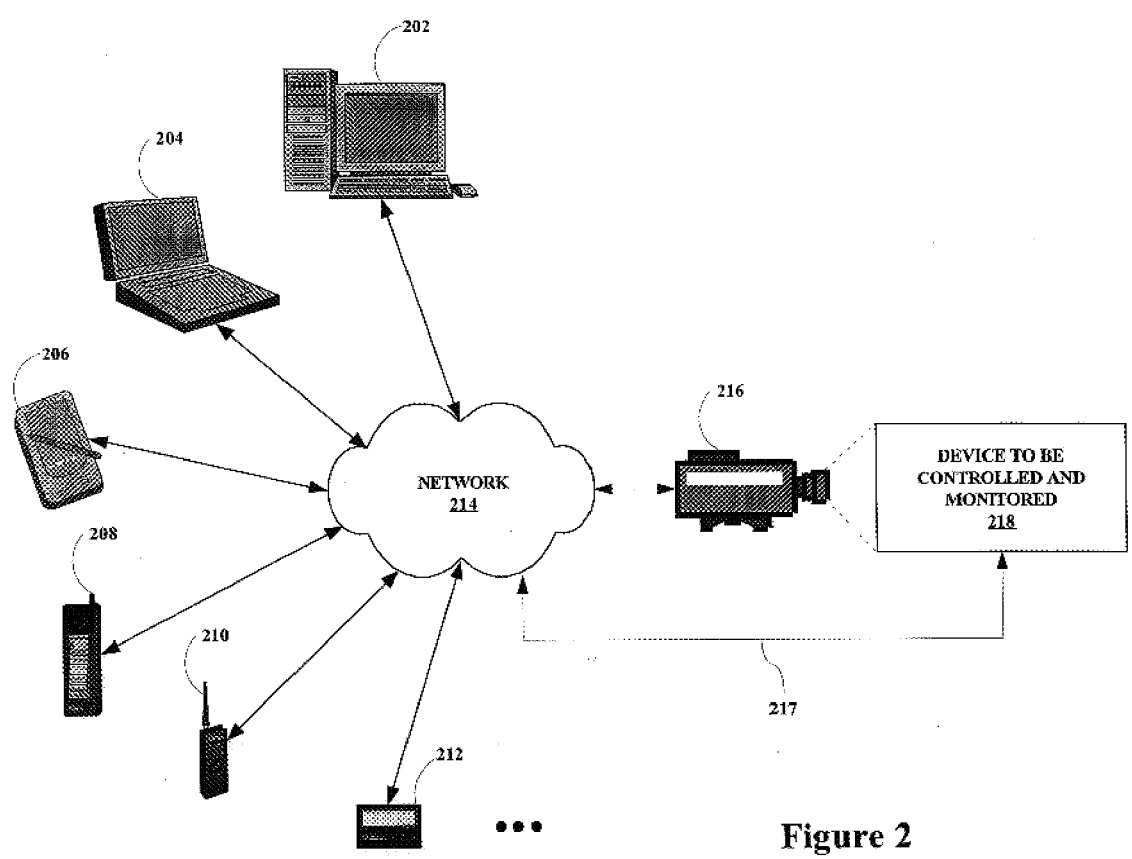
FIG. 2 illustrates various input devices used in conjunction with the present invention's system for remote monitoring and controlling remote devices.

FIG. 2 illustrates how the present invention's system for remote monitoring and controlling is accomplished using various input devices. Users utilize a variety of input devices (such as computers 202, mobile computers such as laptops 204, personal digital assistants or PDAs 206, mobile telephones 208, wireless devices 210, pagers 212, etc.) to control, over network 214, a device to be controlled and monitored 218. Therefore, users are able to view device 218 via camera 216, and are further able to control 217 and monitor device 218. Thus, in the event a malfunction is detected with regard to the monitored device 218, users are able to use the input device (202, 204, 206, 208, 210, or 212) to access and control the monitored device 218 to rectify the error.

Therefore, the system of the present invention transmits locally resident code to the remote user for generation of graphical display panels and then focuses on the transmission of necessary information only to update the data on those panels. The system of the present invention is implemented using Java®, but one skilled in the art should realize that the system can be implemented in equivalent environments, and therefore should not be used to limit the scope of the invention.

Furthermore, the system of the present invention uses concurrent video over a network in order to provide a visual response in addition to the graphical user interface panels for control, operation, and monitoring. In an extended embodiment of the present invention, a text-based "chat" function is run concurrently over the network for real-time message communication between local and remote parties. To demonstrate the functionality of the present invention two examples are presented. The first example is a system for real-time remote monitoring and controlling of a sliding door via a network. The second example is a system for real-time remote monitoring, controlling and tuning of an electric motor system.

1) Intelligent Door Monitoring System

The present invention's intelligent door monitoring system (IDMS) is designed to allow automatic monitoring of door entrances by sending an email alert to a maintenance organization when a door is in need of service or when preventative maintenance is recommended. Monitoring is continuous and automatic with service alerts initiated only when needed. The system of the present invention minimizes door down time and decreases manual monitoring costs. Email messaging allows for efficient and reliable communications with the remote devices and provides for a national or international monitoring network that is suitable for distributed retail chains or organizations. Such email monitoring is accomplished via any of the input devices illustrated in FIG. 2 as well as other known and future electronic devices connected to a network (wired or wireless).

The IDMS monitors door activity via attached sensors and is programmed to initiate an email alert when a door is stuck open or when the door has accumulated enough open-close cycles that preventative maintenance is recommended. Sensors can accommodate any type of entrances from any manufacturer including sliding doors, bi-fold doors, and traditional doorways. The IDMS unit of the present invention is a self-contained out-of-the-box solution requiring only standard wall outlet AC power and a telephone line with access to a remote Internet Service Provider (ISP). These units are factory programmable and can be configured to monitor other alert conditions, if desired.

It should be noted that although the above-described example illustrates monitoring and controlling sliding doors, one skilled in the art can extend the system of the present invention to encompass other devices and environments to be monitored.

Therefore, the present invention provides for a device for automatic monitoring of door operation with the ability to send message information to alert of failure, to monitor door status, monitor traffic status, monitor environmental conditions, call for preventive maintenance, and receive information regarding course of action and status. As described earlier, alert information is communicated over data networks, telephone lines, Internet electronic mail, wireless media such as pagers or cell phones. In an extended embodiment, the present invention is used for controlling and monitoring industrial doors thereby helping large department stores to efficiently service and maintain their automatic doors.

Figure 3:
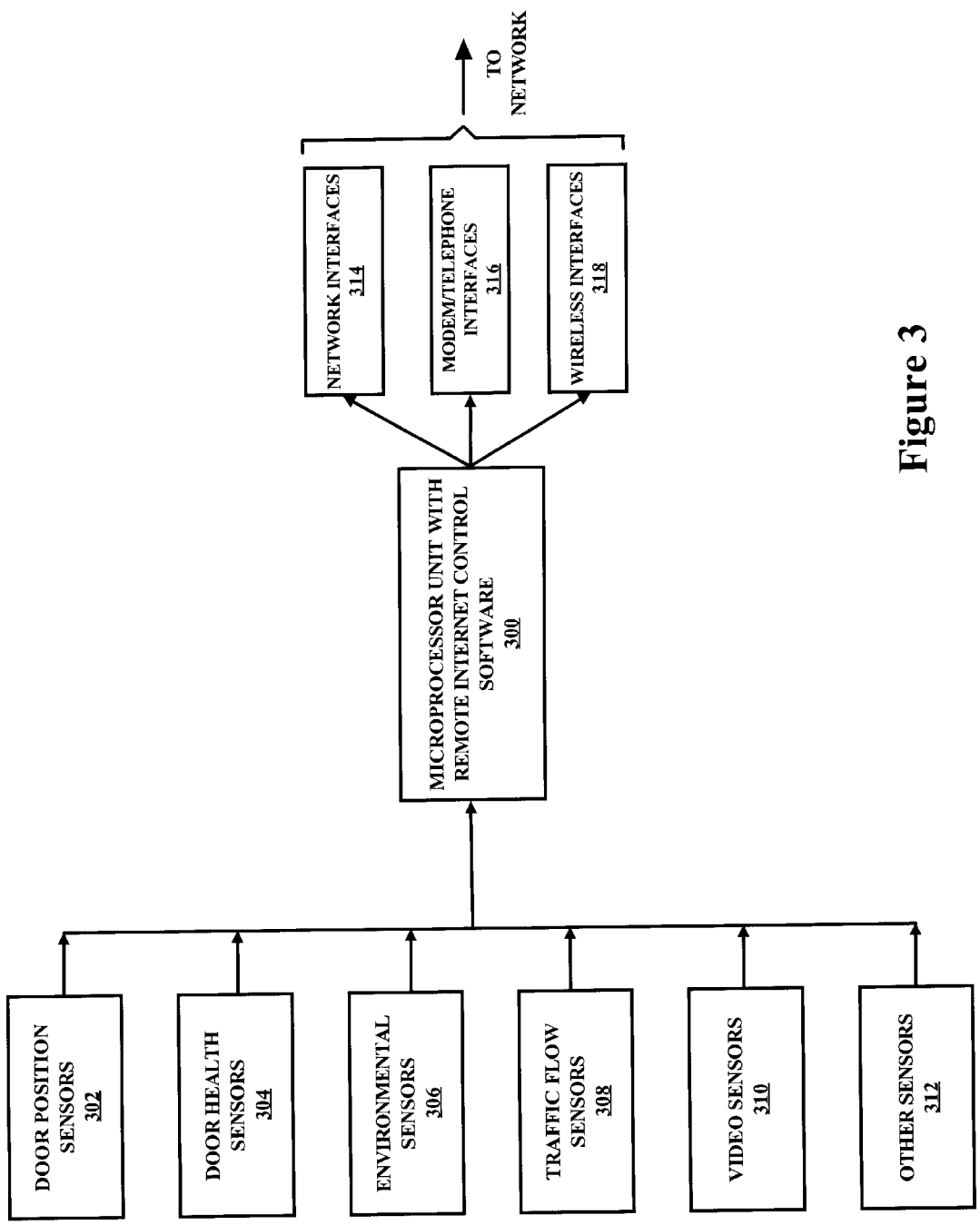
FIG. 3 illustrates examples of various sensors used in conjunction with the present invention's system as used in the remote network-based door monitoring and control system.

FIG. 3 illustrates examples of various sensors used in conjunction with the present invention's system as used in the remote network-based door monitoring and control system. Examples of sensors include, but are not limited to, door position sensors 302, door health sensors 304, environmental sensors 306, traffic flow sensors 308, video sensors 310, or other functionally similar sensors 312. The input from each of these sensors is received by microprocessor 300 that extracts and forwards any relevant information to a remote user via a network interface such as, but not limited to, LAN or WAN network interface 314, modem/telephone interface 316, or wireless interface 318.

The unit will alert designated service groups if a set of alarm conditions have been met. In the preferred embodiment of the present system, the unit will use its dialup telephone line to automatically connect to an Internet service provider (ISP), and then send email alerts to specified parties. The unit is programmed to make connections to the Internet for alarm conditions or at specified times in order to send and receive emailed instructions. These instructions allow for remote reprogramming of the unit as well as to check the unit's status and the condition of the system it is monitoring. Software located within the microprocessor control unit allows for querying information and receiving instructions for further action or monitoring. In an extended embodiment, the unit is able to compile door usage statistics for providing preventive maintenance alerts.

Furthermore, GUI-based software is loaded on the remote input device to give remote users a point-and-click method of sending instructions and receiving information from the monitor unit. It should be noted that there is no limit to the number of monitoring units that can be operated simultaneously. It should be further noted that in the preferred embodiment, each unit being monitored has its own email address to receive instructions and can be remotely programmed to send information to any email addresses.

As mentioned earlier, a variety of sensor types can be connected to the microprocessor unit allowing for other types of remote monitoring. For example, operation of escalators, elevators, temperature, humidity, and security can be accommodated, including video capture. In the preferred embodiment, interfacing for the connection to the microprocessor consists of, but should not be limited to, RS232, RS485, CAN bus, or other types of appropriate signaling and data transfer protocols.

Figure 4:
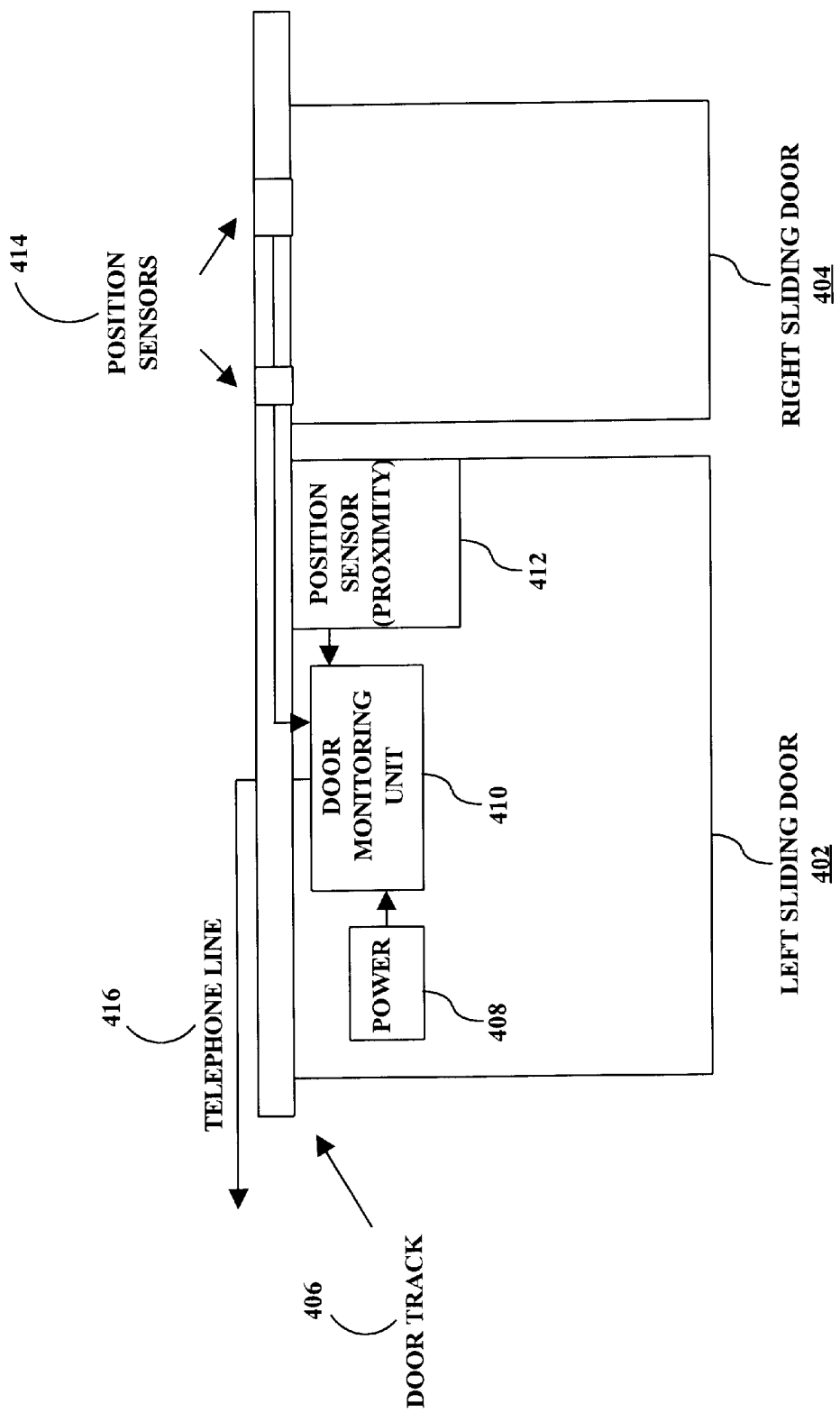
FIG. 4 illustrates the architecture of the complete system for a sliding door arrangement.

It should further be noted that one skilled in the art of communications could substitute many equivalent options for remote signaling in addition to email. Telephone line, Ethernet, wireless (such as to pagers or cell telephones), or other appropriate data communication links. FIG. 4 illustrates the architecture of the complete system for a sliding door arrangement.

The sliding door of the system 400 comprises a left sliding door 402 and a right sliding door 404 that are movable in a door track 406. Furthermore, unit 408 provides power for the door-monitoring unit 410. It should be noted that unit 408 can just be a simple power cord. Proximity sensor 412 is used to determine if the door is open or closed. The door-monitoring unit also keeps a running count to determine door usage. Predetermined alarm conditions will cause the unit to connect to the Internet using the telephone line 416 and send an email or pager alert. Optional proximity sensors 414, located in the door track, can be used to determine door position with higher resolution, if needed.

Figure 5:
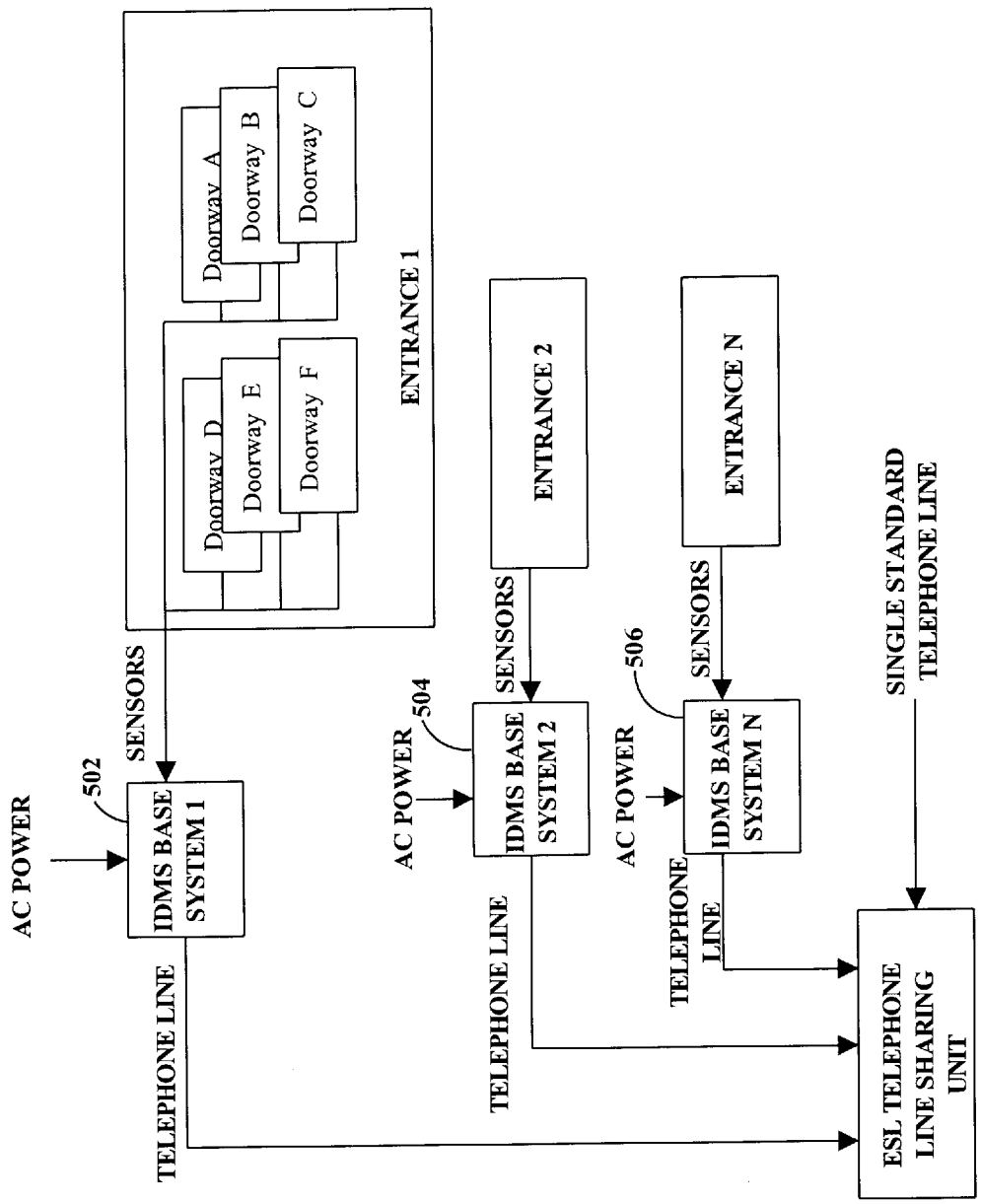
FIG. 5 shows how the intelligent door monitoring system (IDMS) can be configured to monitor several entranceways in a typical retail application.

FIG. 5 shows how the IDMS can be configured to monitor several entranceways in a typical retail application. Each base unit (502, 504, or 506) is able to handle up to 24 sensors and is able to accommodate a complete entrance area. It should also be noted that multiple entrance areas are monitored by dedicating one base unit to each entrance. Furthermore, a single external telephone line is able to accommodate the system by using an ESL telephone line-sharing unit as shown in FIG. 5. It should however be noted that although a sharing unit is used in the example above, the system of the present invention does not require a sharing unit and therefore should not be considered an integral part of the system.

It should further be noted that for obtaining the highest possible reliability, the sensors are solid state, and have no moving parts. The number of sensors per door depends upon the application. Although one sensor per door is the minimum, it is recommended that at least two sensors be used with sliding doors. This allows the unit to distinguish between a door being more than halfway open and less than halfway open. Further resolution in door position is to possible by simply adding more sensors. Moreover, partial position information, if available, can be included in the email alert messages.

As mentioned earlier, each IDMS base unit can both send and receive email messages. An IDMS will send an email message whenever a door is stuck or when door open-close cycles accumulate to the point that preventive maintenance is needed or recommended. The email content tells which condition has initiated the alert, the site location of the door requiring attention, and partial position information, if available. The number of monitored cycles that triggers an alert, or the amount of time that a door is left open can be remotely programmed in each IDMS by sending it an email message. Therefore, each IDMS requires its own email box and email alerts sent out by each IDMS can be to same, different or multiple email addresses. Moreover, the target address of the outgoing email can also be remotely programmed.

As described above, the first example provides for a system for real-time remote monitoring and controlling of a sliding door via a network.

With the increasing complexity and cross-disciplinary nature of technical research and modern product development, there is a growing need for interactive, collaborative experimentation unlimited by physical location. Many multinational or geographically distributed companies utilize different divisions, each with their own technical specialties, in the product development cycle. When system experiments need to be performed, this distributed expertise must all have access to the hardware laboratory. In order to avoid the costly expense of moving equipment and personnel from each location to the laboratory, there is a need for a virtual laboratory accessible over a network. It should be noted that this is not to be confused with remote computer simulations or teleconferencing technology; the network-based virtual laboratory of the present invention for controlling and monitoring motors allows for interactive control of actual system hardware. As the second of the examples of the present invention, described below is an implementation of a novel, virtual engineering laboratory (VE-LAB) that uses the World Wide Web for real-time interactive monitoring, controlling and tuning of a motor experimentation platform. Using a standard Web browser, VE-LAB allows a hybrid electric vehicle starter/alternator to be remotely and interactively operated in real-time by research scientists from across the country.

2) Real-Time Interactive Monitoring, Controlling and Tuning of An Electric Motor The present invention further adds Web-based remote control to the fuzzy efficiency optimization of the hybrid electric vehicle (HEV) starter/alternator. In a specific embodiment, the Web enabled motor experimentation platform provides digital control of an 8 kW induction motor starter/alternator and a programmable load. It should however be noted that although a specific example of an induction motor is used to illustrate this embodiment, one skilled in the art can extend this concept to encompass other motors and therefore it should not be used to limit the scope of the invention. An outer-loop fuzzy logic controller is used to automatically tune the starter/alternator for optimum efficiency given a user specified operating point. Furthermore, a graphical user interface provides both local and remote operator control of the experiments. Data is presented in real-time both locally and remotely to monitor the progress of the experiment, and stored data is available for further offline analysis.

A) Motor Experimentation Platform

Figure 6:
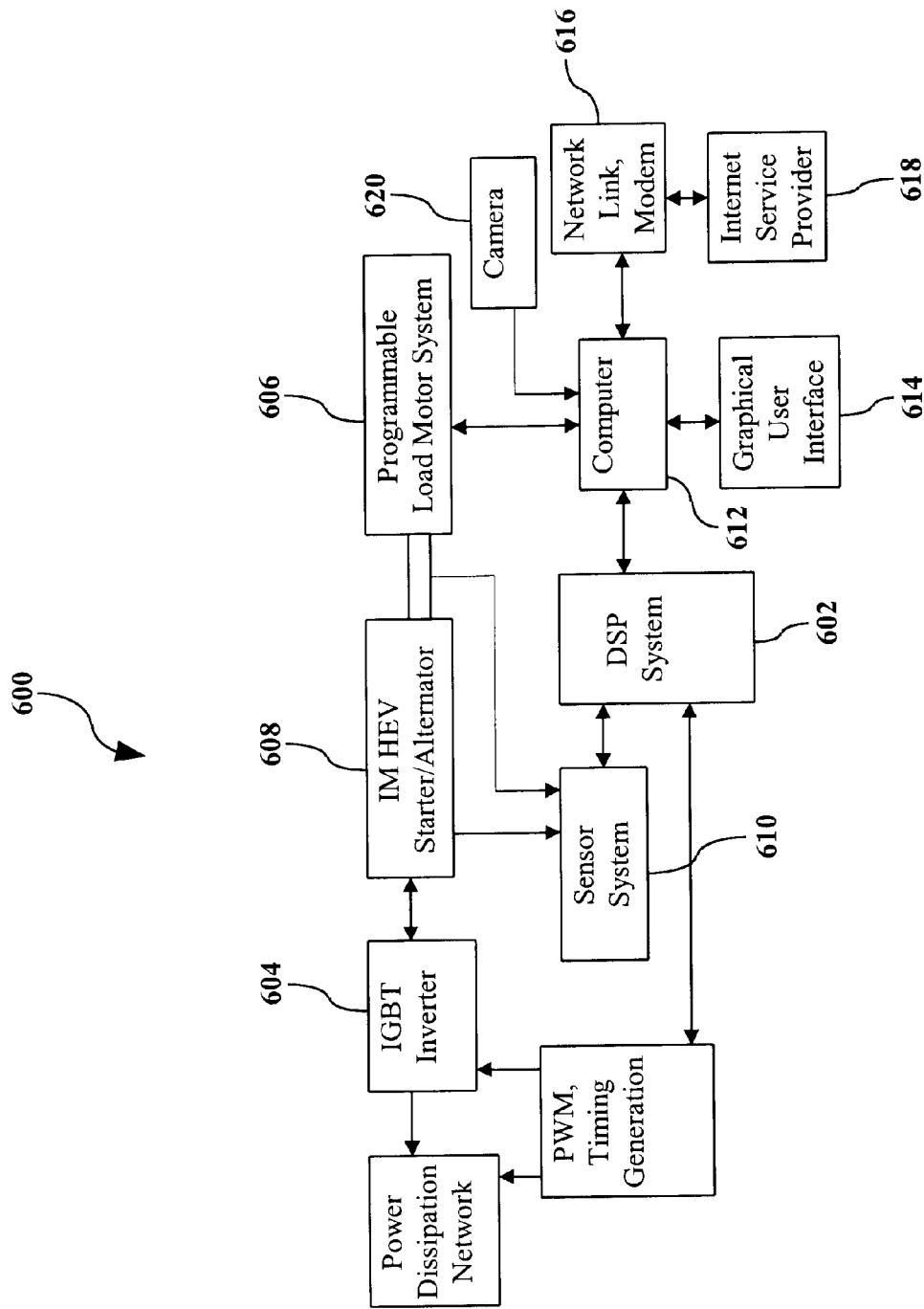
FIG. 6 illustrates a block diagram of the motor experimentation platform.

FIG. 6 illustrates a block diagram of the motor experimentation platform 600. As stated earlier, the starter/alternator is a 12 pole, 8 kW induction machine. The digital signal processing (DSP) system 602 is based on a TMS320C32 DSP (although other equivalents can be used) and is responsible for the implementation of an indirect vector current controller and velocity controller, along with all PWM timing generation. It should be noted that, one skilled in the art can extend the present system to include various other controllers and motors. Generated energy is dissipated in an IGBT-switched resistor-braking network. The DC bus voltage applied to the inverter 602 is maintained between 300 volts and 350 volts by a hysteretic voltage controller, also implemented in the DSP. The programmable load motor 606 allows for the generation of active load profiles to emulate various load and road conditions, as reflected to the starter/alternator 608. The sensor system 610 conditions and samples starter/alternator mechanical power at the shaft, electrical power output from its terminals, and DC bus power applied to the inverter. Efficiency can be measured for any system component or combination of components.

Data and commands are transferred between the DSP system 602 and the computer 612 via shared memory (not shown). User data gathering and command inputs are presented to the computer 612 via a graphical user interface 614. Connection to the Internet is made through a local area network (LAN), into a dialup modem 616, and finally through a commercial ISP 618. A computer video camera 620 is used to provide remote viewing of the experiment via the Web. Communication software, such as Microsoft NetMeeting®, resident on the computer is responsible for communicating live video and chat capabilities over the network.

B) Fuzzy Logic Efficiency Controller

Figure 7:
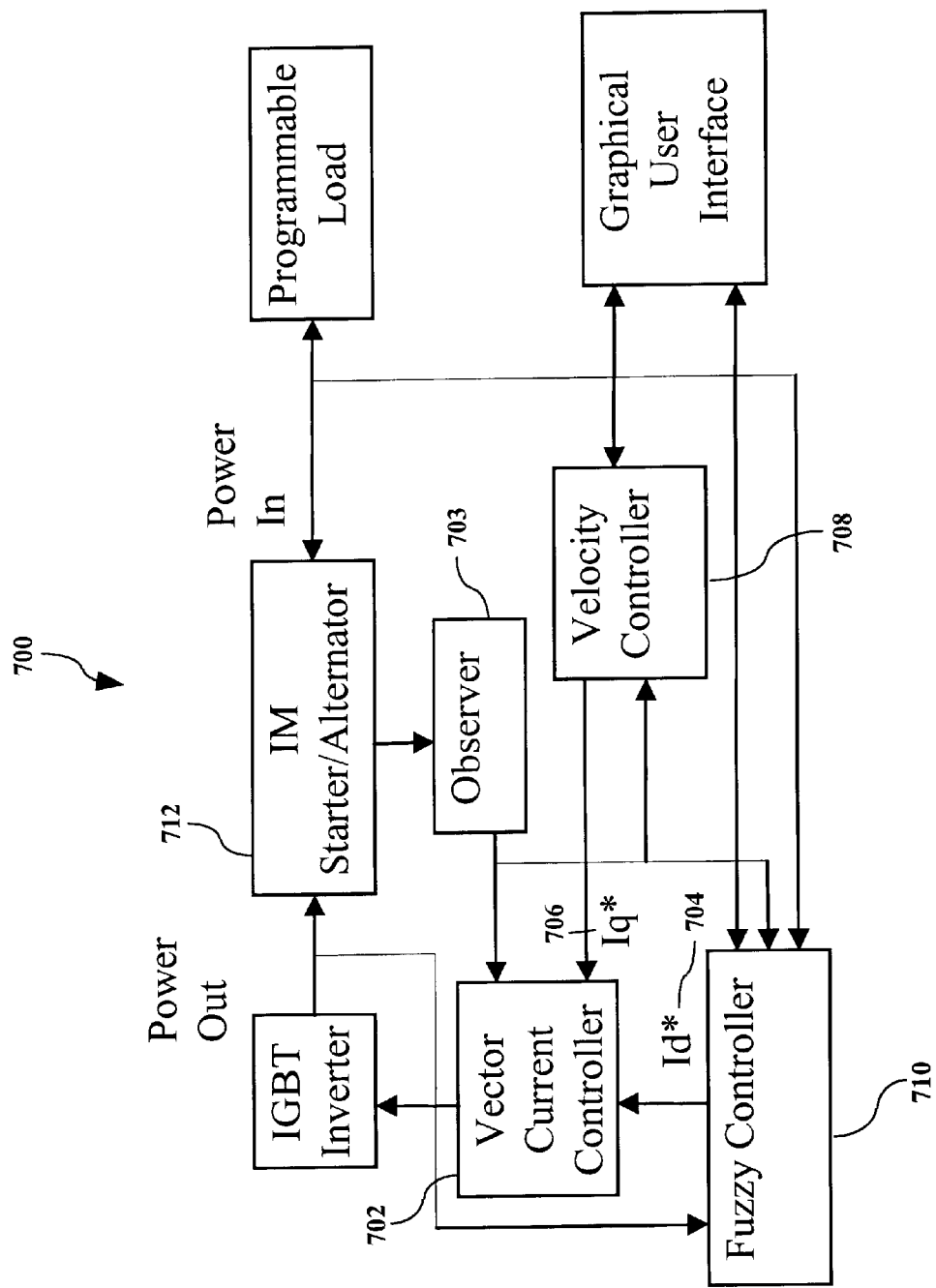
FIG. 7 illustrates a block diagram of the system control structure.

Induction machines are normally operated at rated flux to achieve their best dynamic response. However, under less than rated load conditions, operation at rated flux can cause excessive core losses that result in below optimum efficiency. Under these conditions, the flux can be reduced with the objective of achieving optimum efficiency operation. Therefore a fuzzy logic controller is used to automatically determine the proper flux level for optimum efficiency operation under varying load and temperature. However, the reduction of flux also decreases the transient response of the motor. The tradeoff between dynamic response and efficiency is application dependent. Therefore, the objective is to obtain maximum efficiency mapping of the starter/alternator operating points FIG. 7 illustrates a block diagram of the system control structure 700. An inner-loop indirect field oriented vector current controller 702 is used to regulate the motor currents. A mechanical observer 703 with input from a 4096-count shaft encoder is used to generate rotor position and speed estimates. The velocity controller 708 generates torque commands that are combined with the commands Id* 704 to generate Iq* 706 commands to the current controller 702. Because the electromagnetic torque is proportional to the product of Id and Iq, changes in Id* effectively tune the torque gain of the system. The resulting torque perturbations are then automatically compensated for by Iq* commands from the velocity controller 708. The fuzzy logic efficiency-optimizing controller 710 adjusts the motor's flux to maximize the starter/alternator's 712 electrical output power for a given constant mechanical power. As shown in FIG. 7, the fuzzy optimizing controller accomplishes this as it monitors the change in electrical power out and issues Id* commands. The power-in signal in is used for diagnostic purposes, and not by the fuzzy control algorithm.

There are two inputs to the fuzzy controller, last-change-in-power and last-change-in-Id*. The last-change-in-Id* input can be either positive (P) or negative (N), while the change-in-power input has seven triangular membership functions ranging from negative big (NB) to positive big (PB). The output of the algorithm is the next-change-in-Id*. It also has seven triangular membership functions that range from negative big (NB) to positive big (PB). When added to the previous Id*, a new Id* is generated and issued to the current controller. The fourteen fuzzy logic rules are tabulated in Table 1. The two rightmost columns in the table indicate the value of the output next-change-in-Id*.

TABLE 1

Fuzzy rule base.

| Change in Power | Change id* = N | Change id* = P |
|---|---|---|
| NB | NB | PB |
| NM | NM | PM |
| NS | NS | PS |
| ZE | ZE | ZE |
| PS | PS | NS |
| PM | PM | NM |
| PB | PB | NB |

Tuning of the boundary points between membership functions is accomplished offline using hardware data-in-the-simulation-loop. Furthermore, defuzzification is accomplished with a discrete approximation to a centroid calculation.

C) Web-Based Control

The use of real-time Web based control allows geographically distributed teams to remotely conduct experimental work on the fuzzy efficiency optimized starter/alternator system via a network such as the Internet.

(i) VE-LAB Architecture

Figure 8:
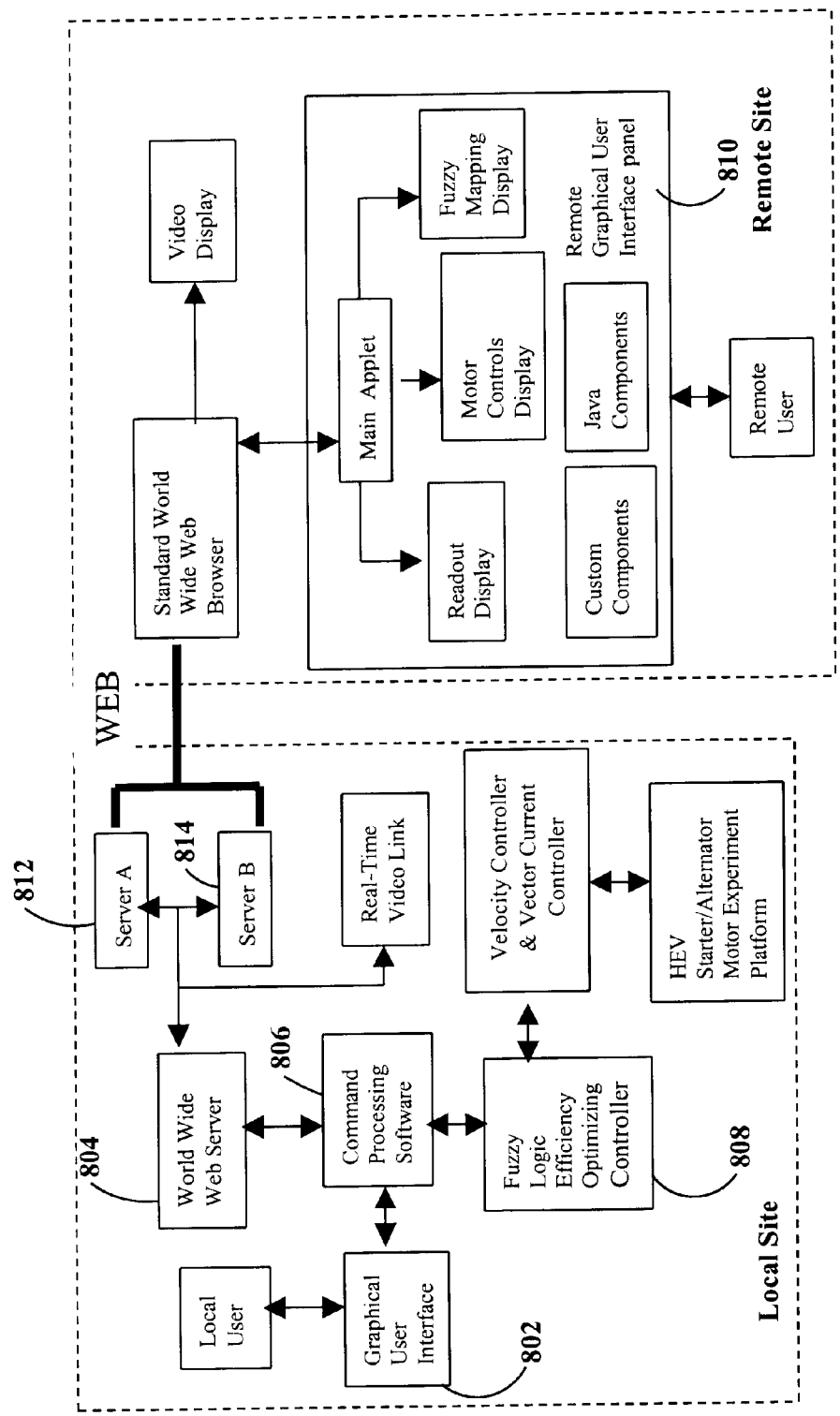
FIG. 8 illustrates the virtual engineering laboratory architecture.

The VE-Lab architecture is diagrammed in FIG. 8. The local graphical user interface 802 allows user input from a mouse and keyboard, and presents data output from the experiment.

Real-time video from a mini-camera mounted on the computer is also simultaneously displayed using communication software such as Microsoft NetMeeting. The Web server 804 is coded on the local computer and acts as a host for Web communications.

A command processor 806 responds to incoming commands from both the graphical user interface 802 and the Web server 804, and passes the appropriate commands on to the fuzzy logic control system 808, and updates both local 802 and remote graphical interface panels 810.

The remote site can be physically located wherever there is an available Web connection with a standard Web browser. The remote graphical user interface panel 810 allows the remote user to monitor commands initiated by the local user, allows the remote user to operate and interact with the motor platform, and allows the remote user to receive real-time experimental data. The remote-side video connection also uses communication software such as Microsoft NetMeeting to simultaneously add a visual confirmation to the operator's commands. In addition, the communication software's chat capabilities allow local and remote users to communicate directly during the experiments.

At the conclusion of a series of tests, the remote user is prompted to receive a data file containing relevant parameters from the experiment such as efficiency, power, and motor temperatures. If accepted, the file is transferred to the remote user, saved on the remote computer, and specialized software such as Microsoft Excel® is automatically launched to display the saved data for further analysis.

Figure 9:
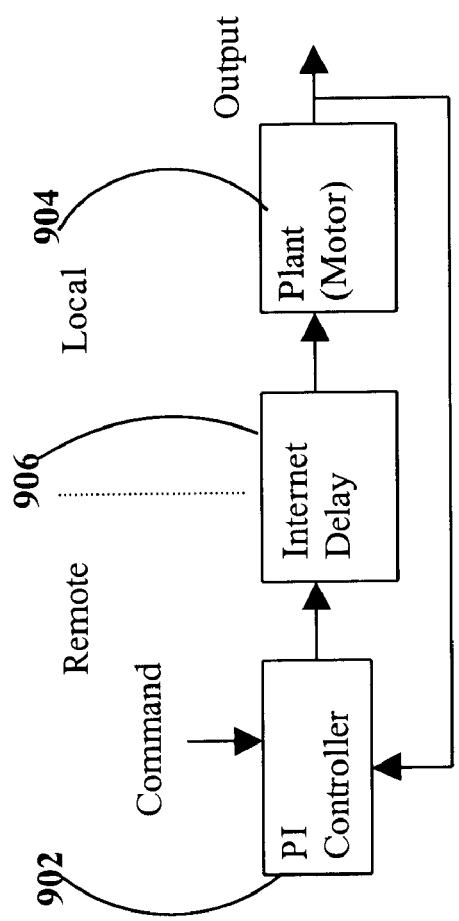
FIG. 9 illustrates a block diagram of a system with a network, such as the Internet, in the feedback loop.

A central issue in the performance of the system of the present invention is time delay. The exact time lag in a particular Web connected session is not known, especially in the case of dialup networking. The computational power of a particular computer, its type of operating system, and the concurrent use of real-time video also add to the variability in time delay when communicating data between the local site and the remote site. This has architectural implications. FIG. 9 illustrates a block diagram of a system with a network such as the Internet in the feedback loop. If the controller 902 is located on the remote site and the plant 904 is located at the local site, then the time delay 906 of the Internet communication channel will be inside the closed-loop system.

Figure 10:
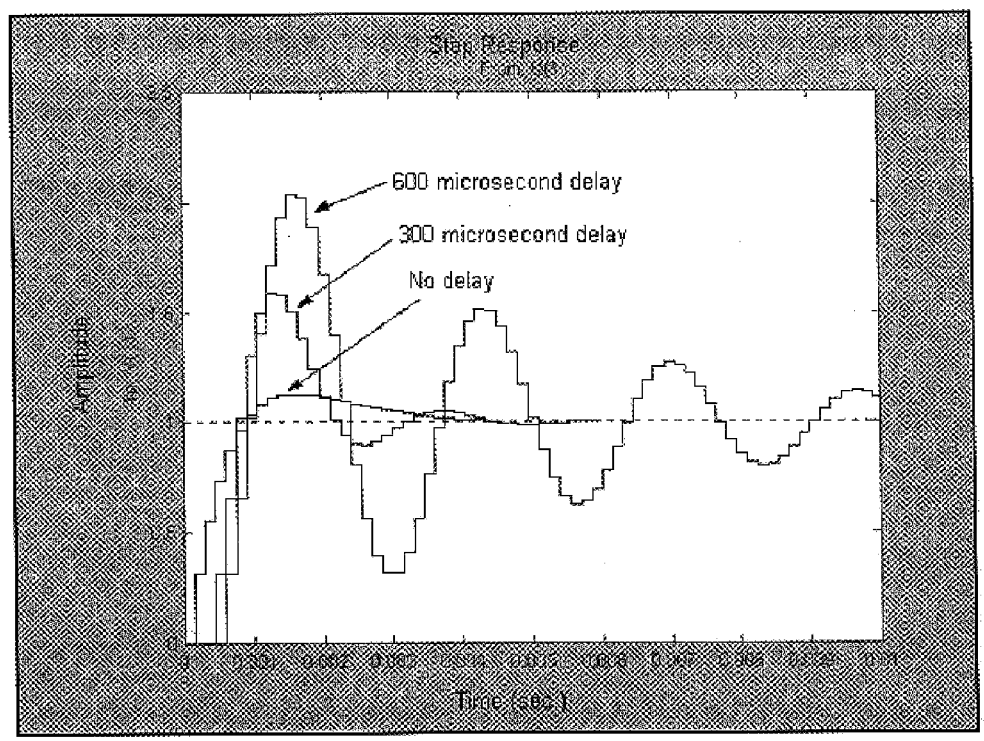
FIG. 10 shows the step response of the quadrature component of a vector current controller with varying delays.

The Internet time delay will affect the performance of the system. FIG. 10 shows the step response of the quadrature component of a vector current controller with varying delays. Without any delay, the sampled current response has about a 1-millisecond risetime. As the delay is increased, the performance is degraded and an underdamped response is observed. Further delay results in instability.

Figure 11:
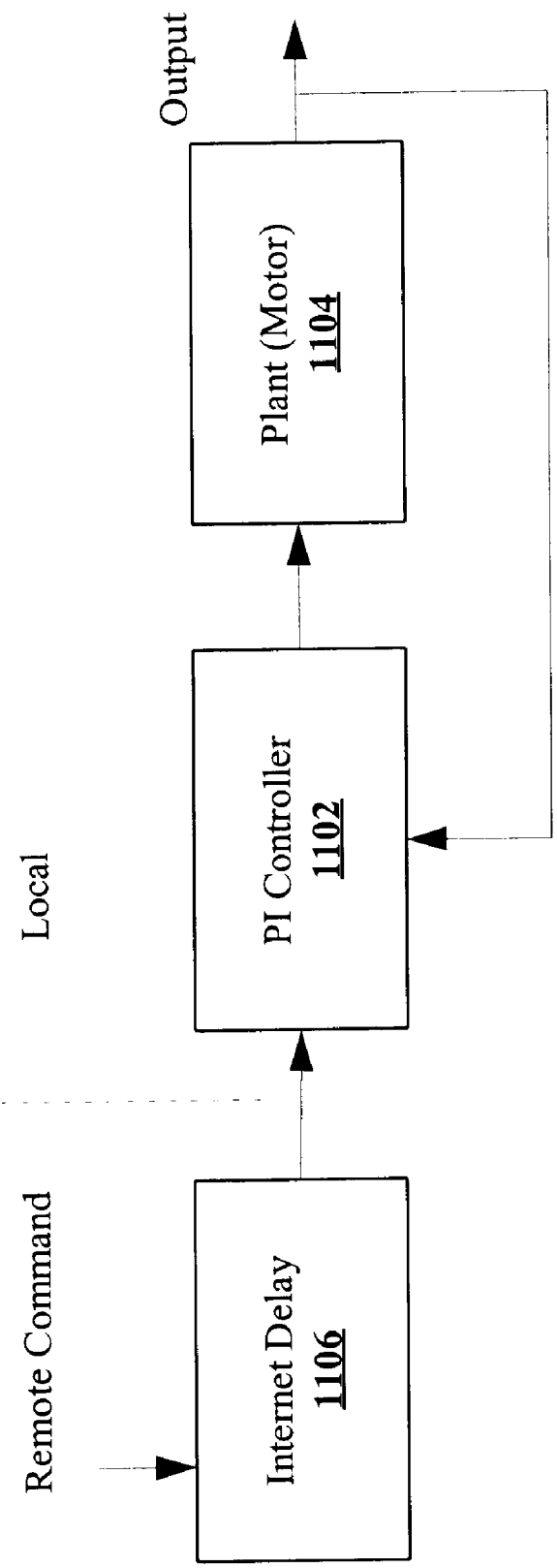
FIG. 11 illustrates the case wherein a network such as the Internet is outside the feedback loop.

To remove the possibility of instability due to the Internet delay, the Internet is taken out of the feedback loop. FIG. 11 illustrates the case wherein a network such as the Internet is outside the feedback loop. In this case, the PI controller 1102 is local with the plant 1104, while the controller commands are processed remotely. There is a delay 1106 between the actual command and the local initiation of action, but there are no instability problems.

Sufficient delay between remote commands and local action can make it difficult for a remote user to quickly react to adverse situations at the actual lab site. Therefore, a combination of software and hardware safeguards are implemented to ensure system integrity in the event of improper user commands, or in the extreme case of a complete loss of the Internet communication channel. In particular, the system includes overcurrent and overvoltage hardware protection and software limits that do not allow excessive velocity or torque commands. In addition, the local controllers maintain their last received set point commands in the event that no updates are received from the remote operator. It should however be noted that there is a tradeoff between system protection and system operating flexibility. User sophistication and experimental requirements are important considerations in this tradeoff.

The effect of the Internet communication delay on the user is also amplified by the requirement of the user to conveniently interact with a real-time graphical user interface for remote control, monitoring, and tuning of the experiment. When updating graphical interfaces, a bitmap of the entire screen can be sent, or a local copy of the graphical screen can be updated by sending only the required data. The second method is employed in the preferred embodiment of the present invention's system, but it is not desirable to require the remote user to maintain a copy of the graphical screen software. This limitation can be overcome by embedding the code for the remote graphical user interface panels in the local Web server using Java® language applets. Upon establishing a connection, the Java applets are automatically sent to the remote site and are launched by the Web browser. With the remote graphical user interface panels now resident on the remote site computer, subsequent real-time communication requires only data and status information transfers, substantially improving system response time.

(ii) Web-Based Communication

In the implementation of the present invention, software (written in a higher level language such as the "C" language) controls the local site communication with the Web, and communication with the motor system. The remote site software consists of Java language applets that are designed to emulate the real-time control and diagnostic processes occurring on the local site during experimentation.

The local site software contains all of the code required to run and perform diagnostics on the starter/alternator. In addition, it also contains the code necessary to read from, and write to, any remote user that requests control of the starter/alternator and access to data readouts. As shown in FIG. 8, remote communication is accomplished via two data servers, data server A 812 and data server B 814. Data server A 812 monitors a logical port on the local machine for incoming data from the remote user. Once read, this data is passed to utility functions for decoding. Numerical data is entered on the local interface panel or logical buttons are depressed in accordance with the interpreted command. After the action has been completed, an acknowledgment is sent back to the remote site for confirmation.

Data server B 814 sits idle on its logical port. When local commands are initiated, server B and its utility functions communicate these commands to any remote site that is registered to receive them.

At the remote site, Web communications are controlled by one parent applet. This main applet communicates with three children applets: the readout display, motor control display, and fuzzy mapping control display (see FIG. 3). The parent registers itself as a listener for actions produced by the children. The parent, not by the children, handles all button clicks and textual entries. This also allows for inter-display communications. At the initialization of the parent, a TCP/IP (Transmission Control Protocol/Internet Protocol) connection is opened to the host server B at the local site. This socket is used exclusively to receive streaming data from the local site. The parent applet waits for data from the local site and/or remote site state changes.

Data transmitted from the local site and received by the parent is distinguished by embedded header information. The parent decodes this information then directs the packet to the correct child applet for proper execution. A separate thread of control is created that continuously polls this connection for incoming data. The input stream is buffered to prevent data loss in the event of processing delays.

Another TCP/IP connection is opened to host server A. This connection is used whenever the remote site sends data to the local site. Whenever an action is produced by one of the remote displays, the parent will detect that action and send the corresponding data through this connection to the local site for processing.

Simultaneous operation is possible by the local and remote operators. Commands issued by either operator appear on the graphical user interface of the other operator. Properly conducted, this allows collaboration in the setup and operation of experiments. It should however be noted that care must be taken to avoid conflicting operator instructions. To avoid this, in an extended embodiment priority command handling or a priority lockout scheme are implemented to guarantee a single master operator. In yet another embodiment, a similar implementation is extended to handling multiple remote users.

(iii) Remote Interface Panels

After all connections between the local and the remote site have been established, the motor controls display panel, the readout display panel, and the fuzzy mapping display panel is shown.

Figure 12:
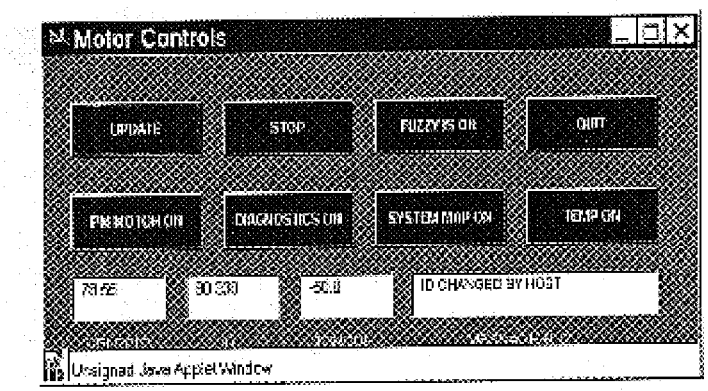
FIG. 12 illustrates the motor controls display Java applet as viewed using a Netscape browser.

The motor controls display is composed of Java buttons and textboxes. FIG. 12 illustrates the motor controls display Java applet as viewed using a Netscape browser. This display panel is used to operate the starter/alternator control hardware. This includes the load motor system, system diagnostics, fuzzy efficiency mapping, temperature monitoring, and velocity, torque, and flux control.

Figure 13:
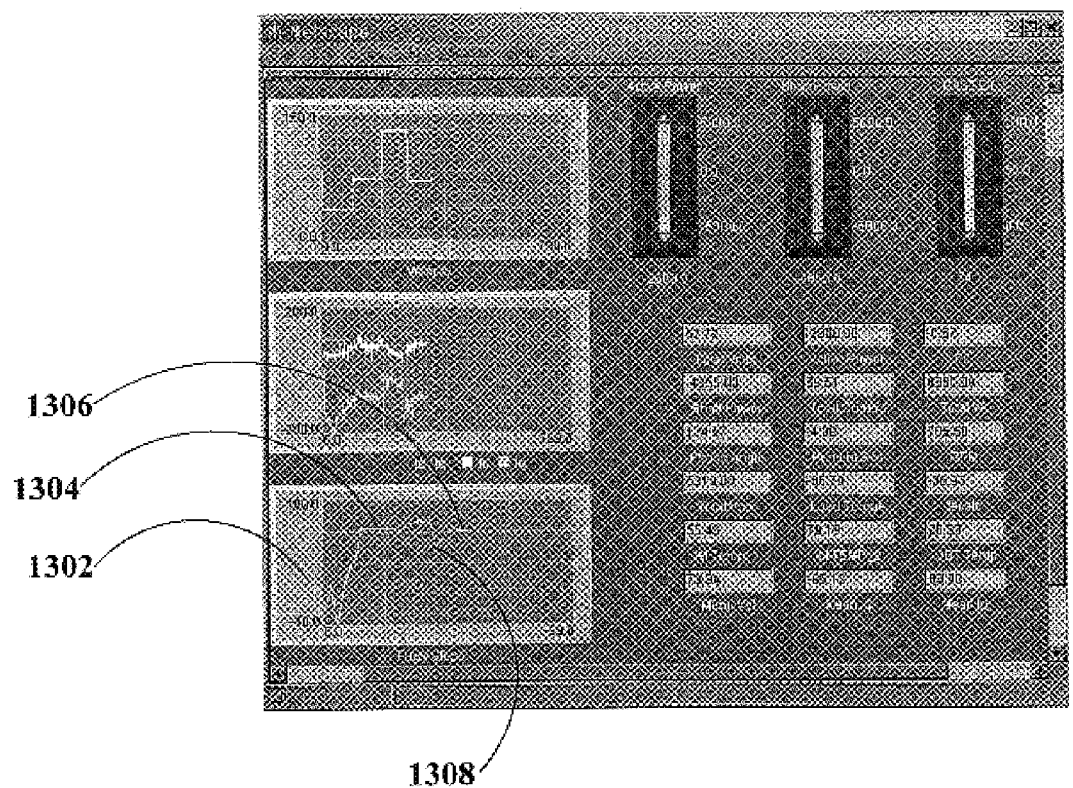
FIG. 13 illustrates a readout display panel containing custom coded graphs and graphical indicators along with Java text boxes.

The readout display panel, as shown in FIG. 13, contains custom coded graphs and graphical indicators along with Java text boxes. The readout panel displays real-time motor diagnostics data in textual as well as graphical format. Notice that velocity, Id, Iq, and efficiency are graphed in real-time. The efficiency plateaus after each transient indicate the effectiveness of the fuzzy logic efficiency optimizer. Output from various other sensors, including a digital power meter and temperature sensors, allows for additional on-line monitoring of the experiment.

Figure 14:
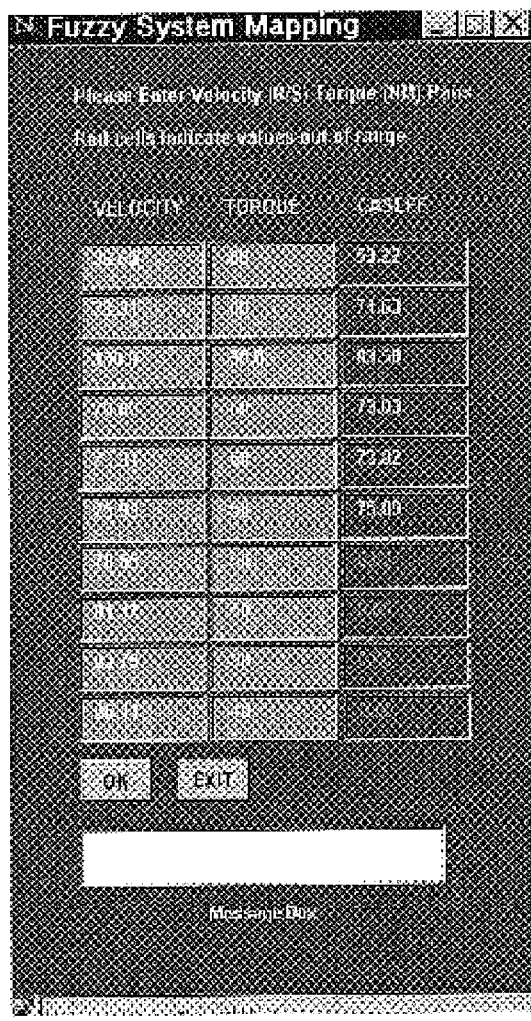
FIG. 14 illustrates a screenshot of the fuzzy system mapping panel.

The fuzzy mapping display is activated whenever the remote user engages the starter/alternator mapping function. The user enters a series of velocity-torque pairs in tabular form, and then initiates the experiment. When the fuzzy optimizer is activated, the experimental system is automatically adjusted to an optimum efficiency point for each table entry. Efficiency results are communicated back to the remote site and automatically entered into the remaining column in the table. In this way, user specific, optimum efficiency contours can be remotely mapped. This panel is shown in FIG. 14.

Figure 15:
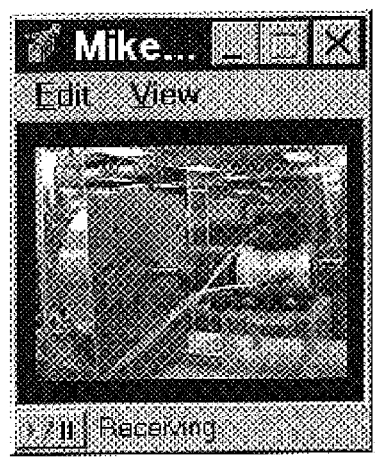
FIG. 15 illustrates an example of remote video transmitted over the Web and displayed at the remote site during the experiment.

FIG. 15 shows an example of remote video transmitted over the Web and displayed at the remote site during the experiment. The starter/alternator is mounted to the vertical support on the left. The programmable load motor is out of the picture on the right, but the serial coupling of the starter/alternator, a torque sensor, and the load motor is visible.

Once the power systems and experimental platform at the local site have been activated, a local connection to the Internet is established via a dialup connection to an Internet service provider. At that time, a Web address or URL is assigned to the local Web server resident on the experimental platform. Remote access is then initiated by anyone on the Internet by applying this URL to a standard Web browser. Once the connection has been established, the remote operator can monitor or control the experimental platform via the graphical user interface panels.

Figure 16:
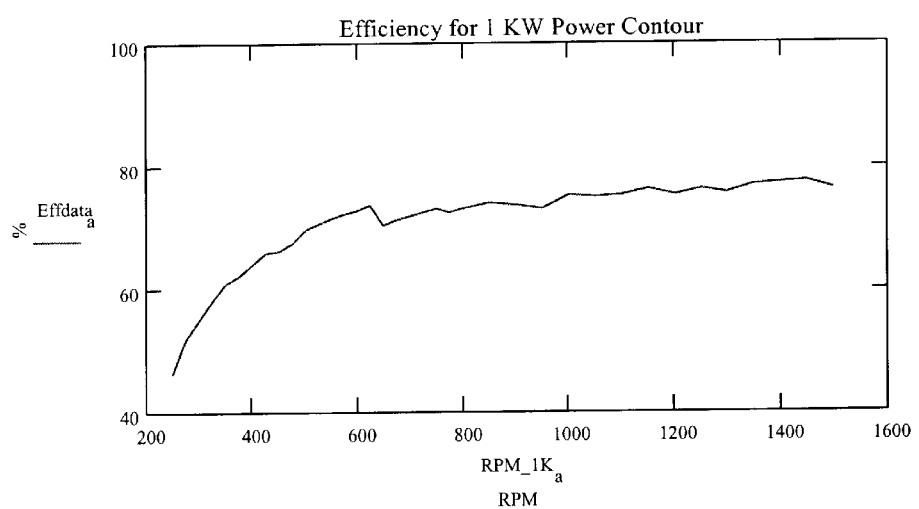
FIG. 16 illustrates a fuzzy efficiency optimized mapping screenshot.

As an example of the effectiveness of the fuzzy efficiency optimizer working under remote conditions, refer to the remote data panel shown in FIG. 13. The third graph from the top 1302 plots efficiency versus fuzzy tuning steps. Each plateau (1304 and 1306) indicates that the fuzzy optimizer has reached an optimum efficiency point. The transient dip 1308 occurred at a change in operating point. Notice that the fuzzy optimizer quickly establishes a new maximum efficiency operating point. The fuzzy tuning steps are being taken at ten second intervals. FIG. 16 shows a fuzzy efficiency optimized mapping across a 1 kW constant power contour.

Figure 17:
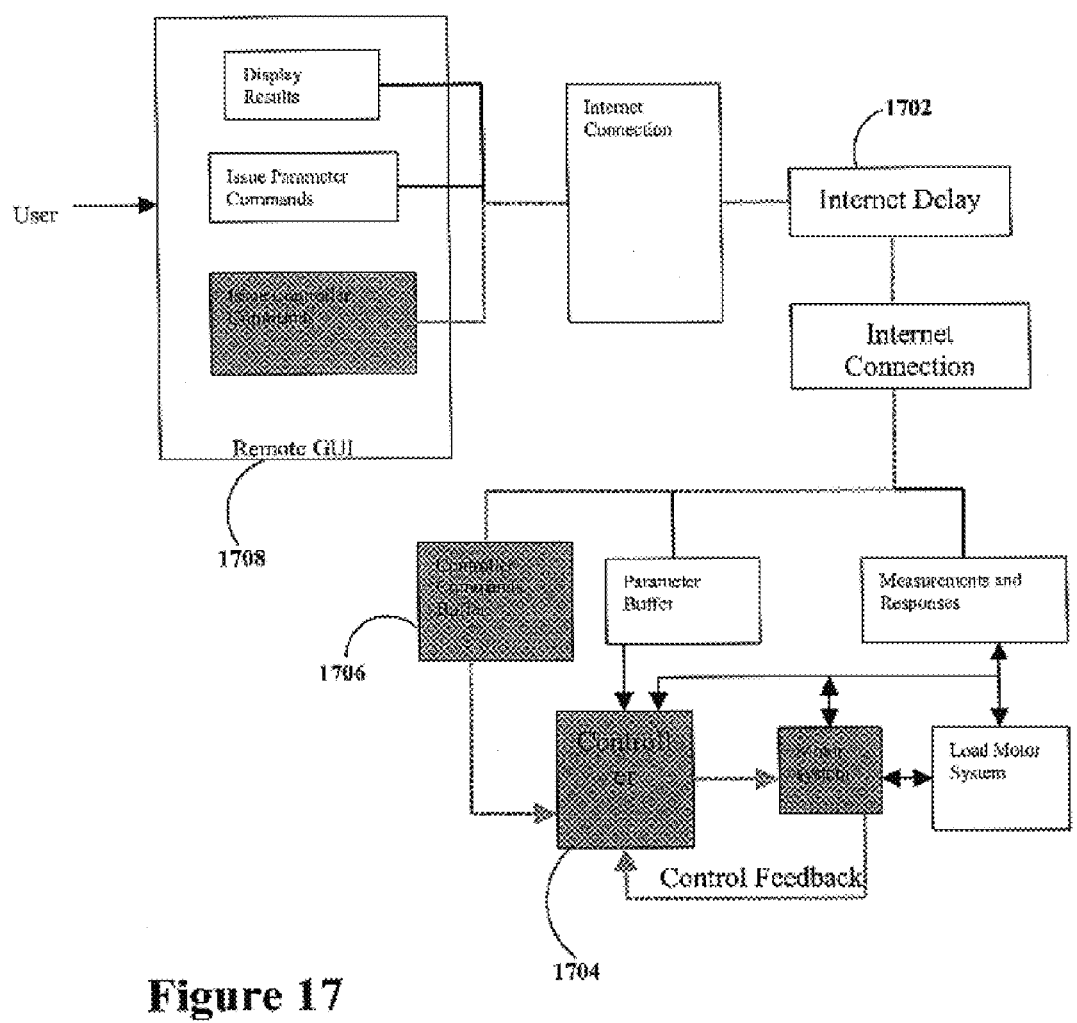
FIG. 17 illustrates a scenario wherein the Internet is not within the closed-loop control path.

As describe earlier, the present system architecture allows remote experiment operation by sending commands to a local controller. As shown in FIG. 17, the Internet is not within the closed-loop control path. Furthermore as stated earlier, the Internet delay 1702 determines how quickly the remote command reaches the controller 1704, but it should be noted that this does not affect system stability.

Controller commands initiated by the remote user are passed across the Internet and processed by the local controller. When conducting efficiency mapping tests, the remote user is able to enter a series of set points in tabular form that is assembled into a command profile, transmitted across the Internet to the controller command buffer 1706, and then processed sequentially by the local controller 1704. Measurements and other quantities of interest are transmitted across the Internet in real time to the remote GUI 1708 for display. In addition, a detailed data file containing test results is sent to the remote user at the conclusion of some prescribed tests for further offline analysis. This data file is compatible with many analysis and database packages and in particular with Excel Spreadsheets. The system is able to automatically launch spreadsheet software such as Excel on the remote user's computer and load the data file. Tuning of the controller or load motor system is accomplished by direct input of remote user or automatically, by the fuzzy controller, if activated.

Described below are various other embodiments of the system architecture to solve the problem of time delay.

Figure 18:
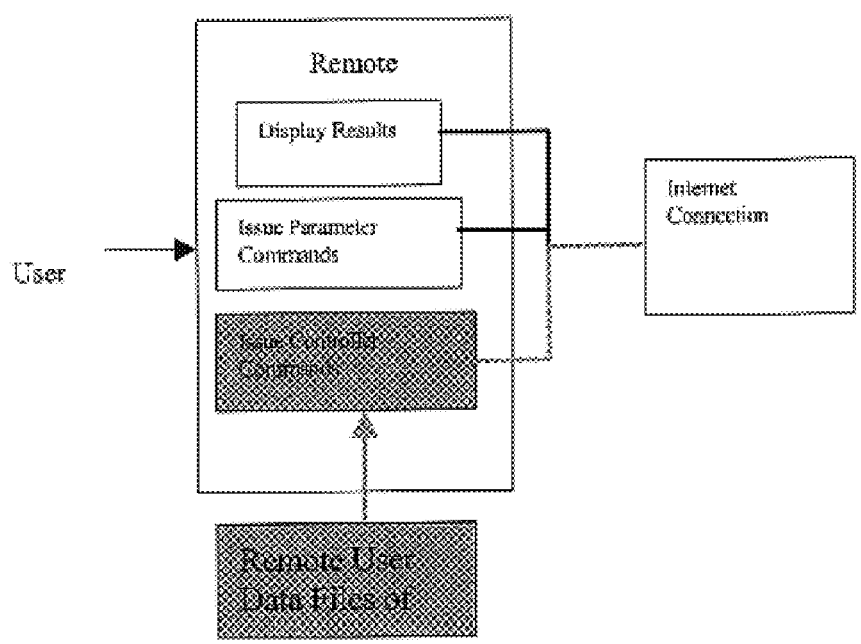
FIG. 18 illustrates a scenario wherein the system allows the remote user to send a large data file containing a series of controller set points correlated with prescribed steps in time such that a precise command profile is achieved.

In an extended embodiment, as shown in FIG. 18, the system allows the remote user to send a large data file containing a series of controller set points correlated with prescribed steps in time such that a precise command profile can be achieved. This profile can be used to command both the test motor and the load motor such that a remote user specified dynamic test can be performed. For example, in vehicular testing applications, the remote user can assemble prerecorded automobile engine data and power requirements into a data file and send it to the local side where the data can be "played back" in real time. In this way the laboratory experiment can emulate the behavior of the actual automobile and truly representative laboratory tests can be performed. The existing architecture already allows playback of prerecorded dynamic tests, but this system enhancement will allow the remote use to send any such tests directly to the local laboratory in real time via the remote GUI. In fact, the remote user may perform a series of such tests by sending more than one dynamic data file to the local laboratory.

Figure 19:
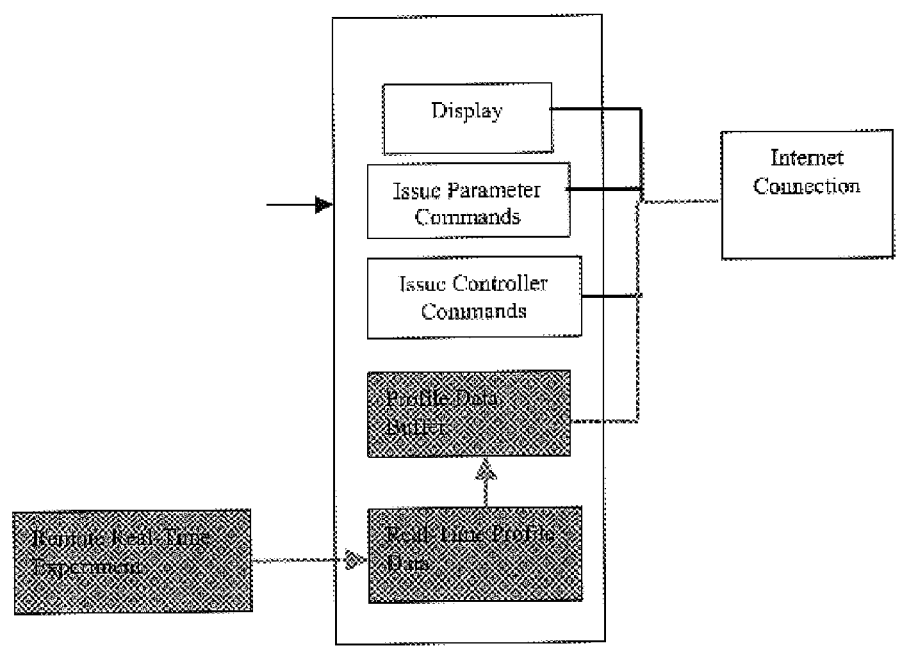
FIG. 19 illustrates an extended embodiment wherein the remote user data file of dynamic profiles is replaced by real-time generation of profile data that is communicated to the local laboratory via the Internet in real-time.

FIG. 19 illustrates yet another extended embodiment wherein the remote user data file of dynamic profiles is replaced by real-time generation of profile data that is communicated to 1e the local laboratory via the Internet in real-time. The Internet delay, while not in the controller feedback path, is now in the forward command path. This does not affect the controlled system stability, but could disrupt the real-time command profiles being continuously transmitted to the local controller. If the delay is large enough relative to rate at which the local controller is emptying its controller command buffer, the buffer could become empty, leaving no command for the next time step. In this event, the local controller would repeat the previous command or predict the value of the missing command based on a combination of previous values and any available apriori knowledge. To minimize the chance of this happening, an elastic profile buffer is added to the remote interface. Therefore, the elastic profile buffer, in combination with the local controller commands buffer, work together to minimize any apparent interruption in the profile data stream caused by the Internet delay.

The system architecture shown in FIG. 19 allows experiments on the remote side to interact in real-time with then locally controlled hardware. For example, an engine speed profile could be measured in a remote real-time experiment and emulated in real-time on the local system. One such scenario is wireless RF transmission of an automobile's engine speed as it travels along a roadway transmitted to the remote user interface, then sent across the Internet link to the local system for real-time dynamic profiling on the local system. As another example, the speed profile over a bicycle path could be replayed over a network such as the Internet on a dynamically programmable fitness bike.

Figure 20:
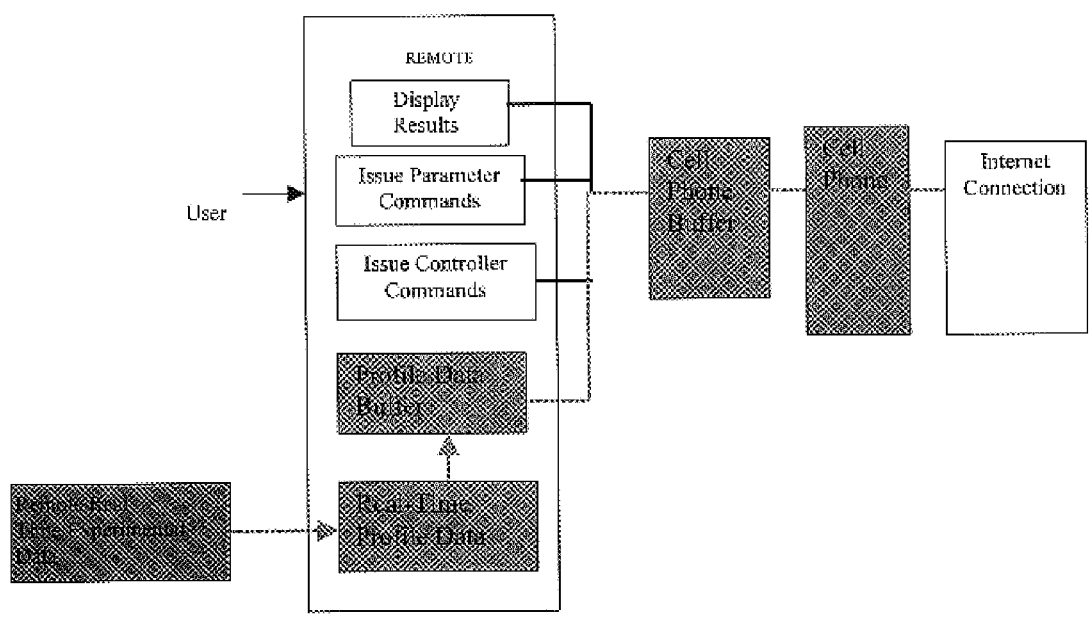
FIG. 20 illustrates yet another embodiment wherein the remote user is actually part of the real time remote hardware experiment.

FIG. 20 illustrates yet another embodiment wherein the remote user is actually part of the real time remote hardware experiment. In a vehicular application, for example, the remote user GUI is located in the vehicle with a mobile connection to the Internet for in-situ real-time dynamic profiling while the vehicle itself is moving. A satellite link and cell phone connection are two possible mobile linking technologies. In the case of a cell phone, the moving vehicle may transition from cell to cell, requiring that the system be able to tolerate a period of complete connection loss with minimal interruption of the effective profile as seen in the local system. This implies enhanced profile buffering, enhanced local command buffering, and perhaps a buffer between the system and the cell phone connection.

Therefore, the local motor system is truly operating in real time as though physically connected to the environment on the remote side of the system. It should be noted that with the system architecture of FIG. 20, several vehicles could simultaneously be contributing information and profiles to the local system. This allows for real-time emulation of distributed systems.

Figure 21:
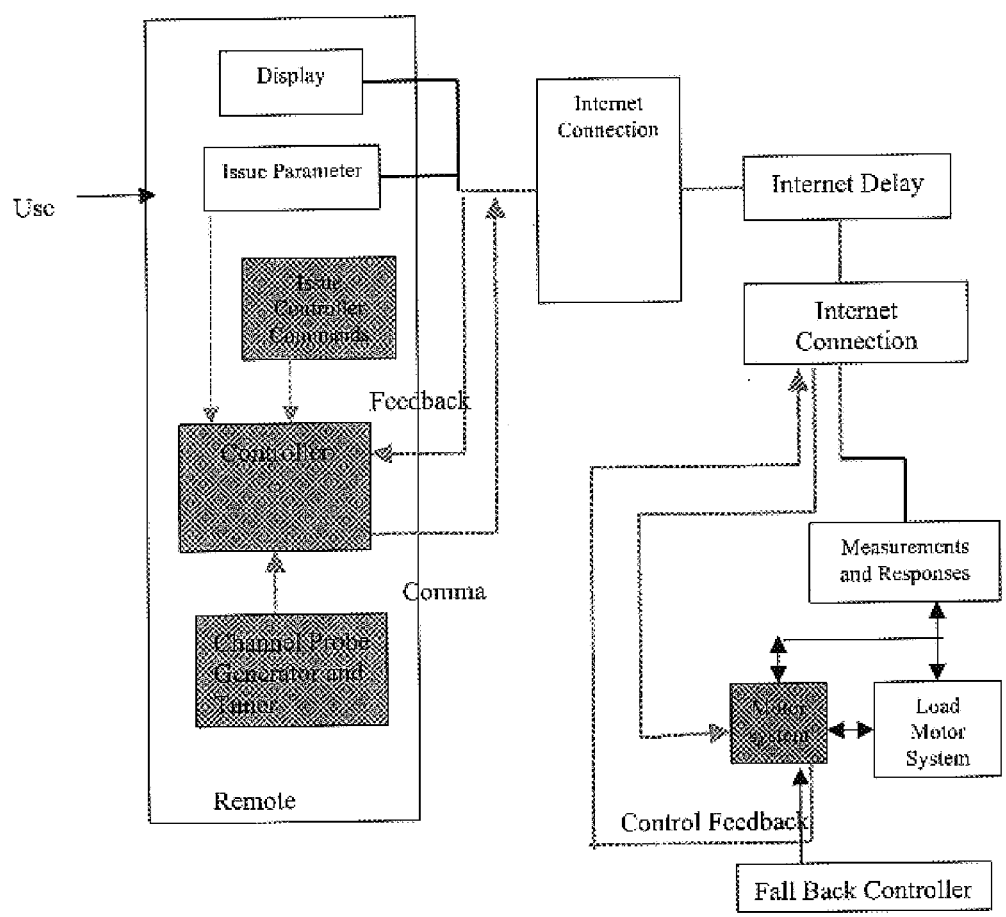
FIG. 21 illustrates another embodiment wherein the Internet delay is estimated by periodic probing of the entire time delay by a send and response pinging signal, and/or monitoring of controller dynamics to detect a change in stability or damping that may reflect a varied time delay.

Finally, in another embodiment as illustrated in FIG. 21, the Internet delay is estimated by periodic probing of the entire time delay by a send and response pinging signal, and/or monitoring of controller dynamics to detect a change in stability or damping that may reflect a varied time delay. An adaptive controller continuously retunes the control system to compensate for this delay. The controller itself is now located on the remote side and the Internet delay is in the closed loop control path with a direct affect on system stability. A local "fall back" controller is running as a switch-in backup in the event that a catastrophic loss of connection occurs with the primary controller.

Thus the present invention's method and system demonstrates the ability to project a virtual presence into a working laboratory such that experiments on actual hardware can be remotely performed. With the geographically distributed expertise of many research and development teams, this can be an important tool that reduces the cost of travel and development iterations often required to access specific hardware and expertise. In addition, the use of standard Web browsers allows for ease of accessibility.

The present invention, in an alternative embodiment, is extended for remotely calibrating instruments over a network such as the Internet. In this instance, the remote monitoring and control technology over a network such as the Internet can be applied so that a device can be checked, operated and calibrated remotely. For example, this extension can be used in material testers.

In yet another embodiment, the system of the present invention is used in dynamic entertainment or fitness systems. In this embodiment, real-time or near real-time information is communicated back to an Internet-connected machine that has the ability to replay data in real-time for entertainment or fitness. For example, an instrumented bike or vehicle could be driven over a particular road where the data is recorded and transmitted in real-time over the Internet to a smart fitness bike. The fitness bike has a programmable load (an electric motor for instance) that then replays the load from the instrumented bike to the fitness bike. In this way, the person on the bike can experience that same feeling that the person on the remote bike is experiencing, as it happens. A similar system could be put in place to simultaneously project the feeling of an actual race car back to a race car simulator, as it happens. This leads to dynamic entertainment, fitness training, etc. and achieves virtual participation in actual events. Note, too, that more than one person can receive the Internet transmission as it happens, allowing large groups of people to share in the experience simultaneously. Note that even after the event, the experience can be replayed at any time by re-broadcasting or storing the instrumented data as it is acquired.

Furthermore, the present invention is also extended to distance learning and remote Web-based education, with students able to gain experience using actual hardware even if it is not locally available. For example, the ability to remotely monitor and control hardware over a network such as the Internet allows for real-time or near real-time distance learning in which actual system hardware is tuned, monitored, and controlled for educational purposes. This differs significantly from current Web distance education that does not use hardware. Furthermore, the availability of high-speed and reliable Internet connection technologies such as ISDN, cable, and DSL promise to further promote the technology demonstrated here.

CONCLUSION

A system and method has been shown in the above embodiments for the effective implementation of a system and method for remote Web-based control. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware, specific local hardware, specific GUIs, and screenshots.

The above enhancements for a system and method for network-based control of remote devices and its described functional elements are implemented in various computing environments. For example, the present invention may be implemented on a conventional IBM PC or equivalent, multi-nodal system (e.g. LAN) or networking system (e.g., Internet, WWW, wireless web). All programming, GUIs, display panels, and data related thereto are stored in computer memory, static or dynamic, and may be retrieved by the user in any of: conventional computer storage, display (i.e. CRT) and/or hardcopy (i.e. printed) formats. The programming of the present invention may be implemented by one of skill in the art of network communications programming.

What is claimed is:

1. A system for providing a real-time network-based controlling and monitoring of a remote device via an electronic-based device, said system comprising:
   one or more sensors measuring one or more parameters associated with said remote device and generating a signal based on said measured one or more parameters, said remote device equipped with a unique electronic address;
   a microprocessor, operatively linked to said remote device and one or more sensors, said microprocessor:
      receiving instructions, via said unique electronic address, from said electronic-based device,
      identifying and monitoring one or more parameters based on controlling said sensors from said received instructions,
      receiving a generated signal from said controlled sensors and extracting said one or more parameters to be controlled and monitored from said received signal, and
      generating an alert signal if said extracted one or more parameters satisfy a set of alarm conditions;
   a network interface transmitting said extracted one or more parameters or said alert signal in real-time to said electronic-based device via said unique electronic address, and
   wherein said electronic-based device controls and monitors said remote device in real-time over a network by passing said instructions to said microprocessor and receives alerts in real-time when a set of alarm conditions are met.

2. A system for providing a real-time network-based controlling and monitoring of a remote device via an electronic-based device, as per claim 1, wherein said network is any of the following: HTTP-based networks, local area networks (LANS), wide area networks (WAN), Internet, or wireless networks.

3. A system for providing a real-time network-based controlling and monitoring of a remote device via an electronic-based device, as per claim 1, wherein said electronic address is any of the following: e-mail address or network address.

4. A system for providing a real-time network-based controlling and monitoring of a remote device via an electronic-based device, as per claim 1, wherein said system further comprises a Java based graphical user interface (GUI) operatively linked to said computer-device, said GUI displaying said monitored and controlled parameter.

5. A system for providing a real-time network-based controlling and monitoring of a remote device via an electronic-based device, as per claim 1, wherein said system further comprises a chat function for real-time messaging between said remote device and said electronic-based device.

6. A system for providing a real-time network-based controlling and monitoring of a remote device via an electronic-based device, as per claim 1, wherein said one or more sensors measure one or more parameters associated with an automatic door.

7. A system for providing a real-time network-based controlling and monitoring of a remote device via an electronic-based device, as per claim 6, wherein said sensors include a combination of any of the following sensors: proximity sensors, door position sensors, door health sensors, environmental sensors, traffic flow sensors, or video sensors.

8. A system for providing a real-time network-based controlling and monitoring of a remote device via an electronic-based device, as per claim 1, wherein said system further includes a statistical analyzer for computing usage statistics.

9. A system for providing a real-time network-based controlling and monitoring of a remote device via an electronic-based device, as per claim 1, wherein said extracted one or more parameters are transmitted via said unique e-mail address to one or more target e-mail addresses.

10. A system for providing a real-time network-based controlling and monitoring of a remote device via an electronic-based device, as per claim 9, wherein said target e-mail addresses are remotely programmable by said remote electronic-based device.

11. A system for providing a real-time network-based controlling and monitoring of a remote device via an electronic-based device, as per claim 1, wherein said remote device is an automatic door, and upon generating said alert signal, said system further generates an immediate response, said immediate response comprising any of the following: holding the door open or closed, restricting access via locking doors, alerting system behavior to sensor stimulus, using video and sensor capture to archive door mechanism, environment, operators, or traffic, and sending e-mail alerts and data to service and supervisory personnel or centers.

12. A method for providing a real-time network-based controlling and monitoring of an automatic door via an electronic-based device, said method as implemented in the monitored automatic door comprising:

receiving instructions in an electronic messaging format over a network from said electronic-based device via an unique electronic address, said instructions identifying one or more parameters to be controlled and monitored in said automatic door;

measuring and controlling said identified one or more parameters associated with said automatic door;

generating an alert signal if said measured one or more parameters to be monitored satisfy a set of alarm conditions;

transmitting said alert signal to said electronic-based device via said unique electronic address; and generating an immediate response said immediate response comprising any of the following: holding door open or closed, restricting access via locking doors, alerting system behavior to sensor stimulus, using video and sensor capture to archive door mechanism, environment, operators, or traffic, and sending e-mail alerts and data to service and supervisory personnel or centers.

13. A method for providing a real-time network-based controlling and monitoring of an automatic door via an electronic-based device, as per claim 12, wherein said network is any of the following: HTTP-based networks, local area networks (LANs), wide area networks (WAN), Internet, or wireless networks.

14. A method for providing a real-time network-based controlling and monitoring of an automatic door via an electronic-based device, as per claim 12, wherein said received instructions are received via a unique e-mail or network address associated with said remote device.

15. A method for providing a real-time network-based controlling and monitoring of an automatic door via an electronic-based device, as per claim 14, wherein said instructions sent in said electronic messaging format are in a markup language format.

16. A system for providing a real-time network-based controlling and monitoring of a programmable device and its associated hardware, said system comprising:

one or more sensors measuring one or more parameters associated with said programmable device and generating a signal based on said measured one or more parameters;

a fuzzy logic controller to automatically determine proper optimum efficiency operation of said programmable device under varying operational conditions;

a digital signal processor, operatively linked to said programmable device, receiving a set of instructions from a remote electronic-based device in a markup language format, said set of instructions received over a network via a network interface, and said digital signal processor identifying one or more parameters to be controlled and monitored, receiving said generated signal and extracting said one or more parameters to be controlled and monitored from said signal;

said network interface transmitting said extracted one or more parameters to said electronic-based device, an adaptive controller continuously retuning the system to compensate for a time delay, said time delay estimated using a send and response pinging signal and/or monitoring of controller dynamics to detect a change in stability or damping that reflects a varied time delay, and wherein said remote electronic-based device receives said extracted one or more parameters and displays said one or more parameters in real-time via an interface, and based on one or more inputs, said interface transmits said set of instructions to said digital signal processor to control and monitor said programmable device.

17. A system for providing a real-time network-based controlling and monitoring of a programmable device and its associated hardware, as per claim 16, wherein said programmable device comprises a remotely located motor.

18. A system for providing a real-time network-based controlling and monitoring of a programmable device and its associated hardware, as per claim 17, wherein said interface further provides for manually tuning the torque gain kIdlI associated with said motor.

19. A system for providing a real-time network-based controlling and monitoring of a programmable device and its associated hardware, as per claim 17, wherein said system automatically controls the torque gain kIdIq via said fuzzy logic controller.

20. A system for providing a real-time network-based controlling and monitoring of a programmable device and its associated hardware, as per claim 17, wherein said system is used as a network based collaborative experimentation system wherein hardware experiments on said motor are performed simultaneously from geographically distributed locations.

21. A system for providing a real-time network-based controlling and monitoring of a programmable device and its associated hardware, as per claim 16, wherein said system is used as a part of any of the following systems: network based equipment servicing, network based diagnostics and repair, remote training, network based equipment servicing, and network based distant learning.

22. A system for providing a real-time network-based controlling and monitoring of a programmable device and its associated hardware, as per claim 16, wherein said system further comprises a chat function for real time message communication.

23. A system for providing a real-time network-based controlling and monitoring of a programmable device and its associated hardware, as per claim 16, wherein said network is any of the following: HTTP-based networks, local area networks (LANs), wide area networks (WAN), Internet, or wireless networks.

24. A system for providing a real-time network-based controlling and monitoring of a programmable device and its associated hardware, as per claim 16, wherein said transmitted one or more parameters automatically invoke one or more application programs on said electronic-based device allowing for activation and utilization of additional software without user intervention in said electronic-based device.

25. A system for providing a real-time network-based controlling and monitoring of a programmable device and its associated hardware, as per claim 16, wherein said system is used as a part of any of the following systems: automotive diagnostics, remote technician diagnostics/repair.

26. A system for providing a real-time network-based controlling and monitoring of a programmable device and its associated hardware, as per claim 16, wherein said system further comprises a Java based graphical user interface (GUI) operatively linked to said programmable device, said GUI displaying said monitored and controlled parameters.

27. A system for providing a real-time network-based controlling and monitoring of a programmable device and its associated hardware, as per claim 16, further comprising a local fall back controller is running as a switch-in backup in the event that a catastrophic loss of connection occurs with a primary controller.

28. A network-based collaborative experimentation system for providing a real-time network-based controlling and monitoring of a remotely located programmable motor and its associated hardware, said collaborative experimentation system comprising:
   one or more sensors measuring one or more parameters associated with said programmable motor and generating a signal based on said measured one or more parameters;
   a digital signal processor, operatively linked to said programmable motor, receiving a set of instructions from a plurality of electronic-based devices in a markup language format for performing collaborative experimentation on said programmable motor from geographically distributed locations, said set of instructions received over a network via a network interface, and said digital signal processor identifying and monitoring one or more parameters based on controlling said sensors and said received instructions, receiving a generated signal from said controlled sensors, and extracting said one or more parameters to be controlled and monitored from said signal;
   said network interface transmitting said extracted one or more parameters to each of said remote electronic-based devices at said geographically distributed locations, and
   wherein each of said remote electronic-based devices is capable of receiving said extracted one or more parameters and displaying said one or more parameters in real-time via an interface, and said interface capable of transmitting, based upon one or more inputs, said set of instructions to said digital signal processor to control and monitor said programmable device.

29. A network-based collaborative experimentation system for providing a real-time network-based controlling and monitoring of a remotely located programmable motor and its associated hardware, as per claim 28, wherein said collaborative experimentation system further comprises a chat function for real time message communication.

30. A network-based collaborative experimentation system for providing a real-time network-based controlling and monitoring of a remotely located programmable motor and its associated hardware, as per claim 28, wherein said network is any of the following: HTTP-based networks, local area networks (LANs), wide area networks (WAN), Internet, or wireless networks.

31. A network-based collaborative experimentation system for providing a real-time network-based controlling and monitoring of a remotely located programmable motor and its associated hardware, as per claim 28, wherein said unique electronic address is any of the following: e-mail address or network address.

32. A system for providing a real-time network-based controlling, monitoring, and mirroring of a remote device, said system comprising:
   one or more sensors measuring one or more parameters associated with a remote device to be mirrored and generating a signal based on said measured one or more parameters, said remote device equipped with a unique electronic address;
   a microprocessor operatively linked to said remote device to be mirrored and one or more sensors, said microprocessor:
      receiving instructions from an electronic-based device via said unique electronic address;
      identifying and monitoring one or more parameters representing operation of said remote device based on controlling said sensors and said received instructions;
      receiving generated signal from said controlled sensors and extracting said one or more parameters to be controlled and monitored from said received signal; and
   a network interface transmitting, in real-time, said extracted one or more parameters to one or more non-collocated electronic-based devices, wherein each of said non-collocated electronic-based devices receives said transmitted real-time data and mirrors the behavior of said remote device.

33. A system for providing a real-time network-based controlling, monitoring, and mirroring of a remote device, as per claim 32, wherein said network is any of the following: HTTP-based networks, local area networks (LANs), wide area networks (WAN), Internet, or wireless networks.

34. A system for providing a real-time network-based controlling, monitoring, and mirroring of a remote device, as per claim 32, wherein said remote device is a motor associated with any of the following: a fitness device or an entertainment device.

* * * * *